Dec. 1, 1942.  E. C. RANEY  2,304,019
CONTROL APPARATUS
Filed April 29, 1941  4 Sheets-Sheet 1
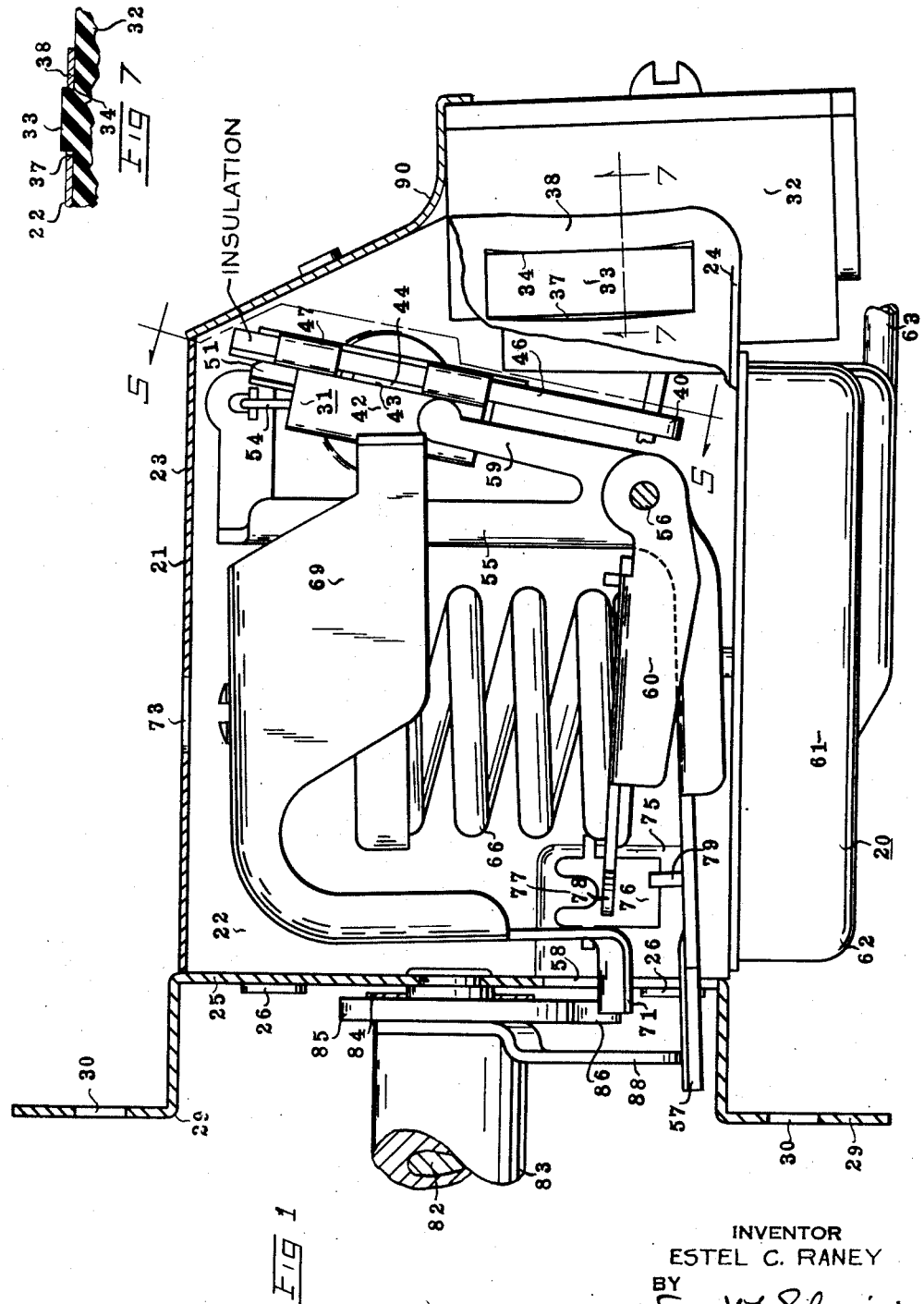
INVENTOR
ESTEL C. RANEY
BY
ATTORNEY

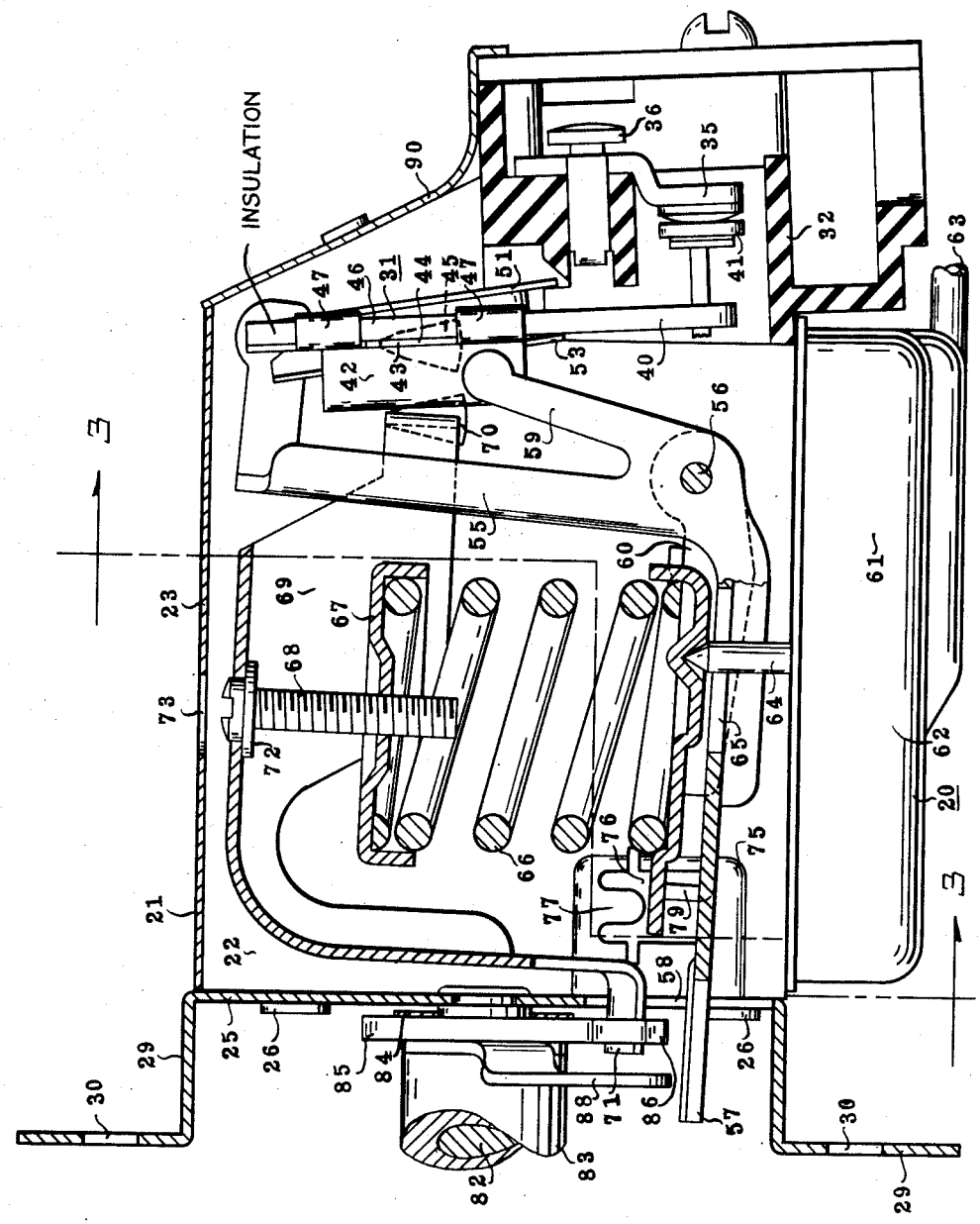

Dec. 1, 1942.  E. C. RANEY  2,304,019
CONTROL APPARATUS
Filed April 29, 1941  4 Sheets-Sheet 3
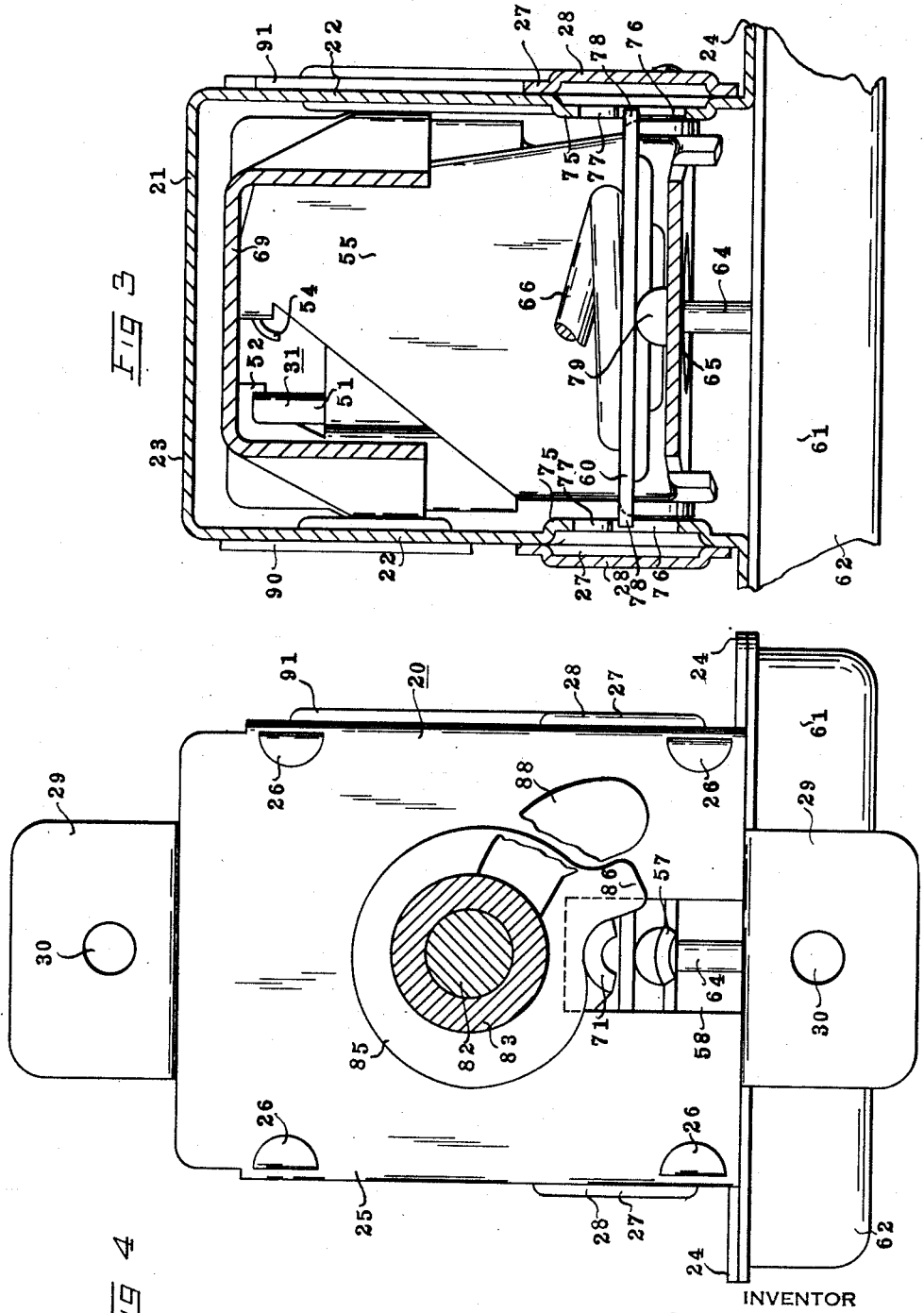
INVENTOR
ESTEL C. RANEY
BY
Warren H. F. Schmeding
ATTORNEY Dec. 1, 1942.    E. C. RANEY    2,304,019
CONTROL APPARATUS
Filed April 29, 1941    4 Sheets—Sheet 4

INVENTOR
ESTEL C. RANEY
BY
ATTORNEY

Patented Dec. 1, 1942

2,304,019

UNITED STATES PATENT OFFICE 2,304,019

CONTROL APPARATUS

Estel C. Raney, Columbus, Ohio, assignor to Ranco Incorporated, Columbus, Ohio, a corporation of Ohio Application April 29, 1941, Serial No. 390,949

3 Claims. (Cl. 200—83)

The present invention relates to control apparatus, and more particularly to a pressure responsive switching mechanism.

An object of the invention is to provide a control apparatus having a control member movable between two control positions by a movable device that is responsive to changes in a condition to be controlled, and which control member may be moved to and retained in one of its control positions by a manually operated mechanism.

Another object of the invention is to provide a snap acting control member that is connected with a condition responsive device by a lever, which lever is resiliently urged in one direction and in engagement with the device, and which is movable in an opposite direction by a manually operated member for actuating the control member to one of its control positions without affecting the condition responsive device.

Other and further objects and advantages will be apparent from the following description, reference being had to the accompanying drawings wherein a preferred form of embodiment of the present invention is clearly shown.

In the drawings:

Fig. 1 is a side view, partly in section, of a control apparatus for an electrically operated refrigerator, certain parts of the control apparatus being omitted;

Fig. 2 is a view similar to Fig. 1, but showing certain parts of the control apparatus in different positions;

Fig. 3 is a view taken substantially on line 3—3 of Fig. 2;

Fig. 4 is a view taken on line 4—4 of Fig. 6, but on a larger scale.

Figure 5:
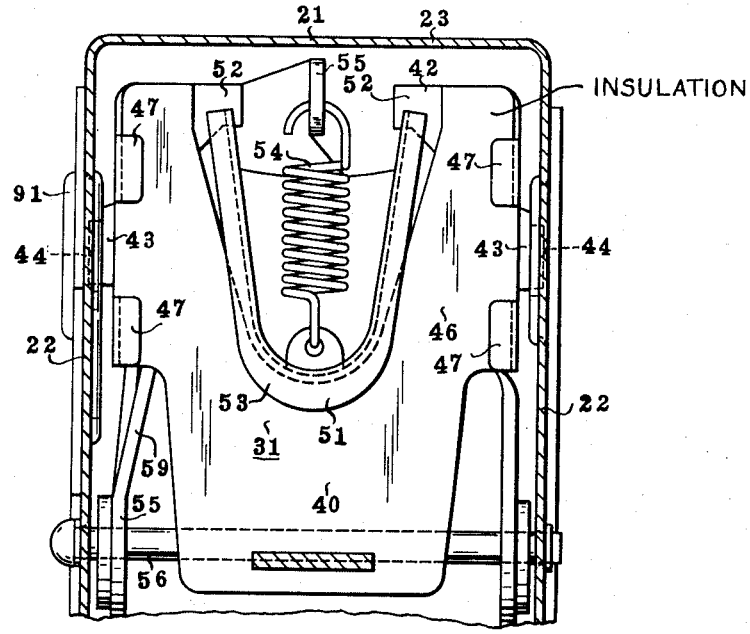
Fig. 5 is a view taken on line 5—5 of Fig. 1.
Figure 6:
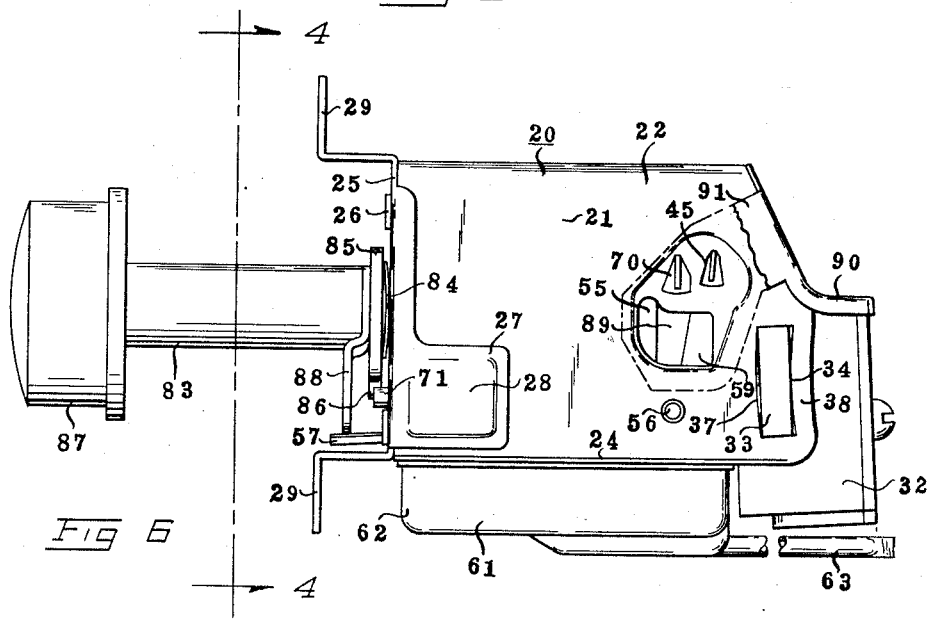
Fig. 6 is a side view in elevation on a smaller scale of the control apparatus, certain parts of the apparatus being broken away; and, Fig. 7 is a view, in section, taken on line 7—7 of Fig. 1.

Referring to the drawings, for the purpose of illustrating one form of embodiment of my invention I have shown a control apparatus 20, which apparatus may control the operation of a household type of electric refrigerator, for example. This control apparatus is similar to the well known type which comprises a switch that is operated by a thermostatic device.

The working parts of the control apparatus 20 are enclosed by and supported on an inverted U shaped frame 21, which frame is preferably formed of sheet metal, and includes confronting side walls 22 and a yoke wall 23. The lower edge portions of the side walls 22 are turned outwardly for forming flanges 24. One end of the frame 21 is closed by a plate 25 which is attached to the frame by four lugs 26, which lugs extend from the end edges of the walls 22, through slots formed in the plate 25, and are clinched against the latter. The plate 25 includes two rearwardly extending sections 27, one of which extends from each side of the plate and overlies a portion of a side wall 22. The sections 27 have offset portions 28 which are formed by pressing portions of the sections 27 outwardly. The purpose of the offsets 28 will appear hereinafter. Mounting brackets 29 are formed at the top and bottom of the plate 25, which brackets have openings 30 for receiving mounting bolts for attaching the control apparatus on the rear side of a baffle plate in the refrigerator which it controls, for example.

A toggle switch mechanism, indicated generally at 31, is mounted adjacent the rear of the frame 21. This switch mechanism is similar to that disclosed in my United States Patent No. 2,202,429, and includes a contact carrying base 32, which base may be formed of a suitably molded dielectric material that is of a resilient nature, and which is supported on the frame 21 by rectangular shaped bosses 33 which extend into rectangular openings 34 formed in the walls 22. The rectangular openings 34 receive the rectangular bosses 33, and the edges 37 of the openings are curved slightly so that the straight edges of the bosses 33 will engage the edges 37 only adjacent the ends of the bosses, and a gap will be formed between the edges 37 and the adjacent edges of the bosses. After the bosses 33 are inserted in the openings 34, a tool is used for bowing the metal strip 38 inwardly against the bosses 33. The bowed edge of the strip 38 engages the bosses 33 intermediate the ends thereof, and since there is a gap between the edges 37 and the bosses 33 the bosses 33 will be deflected slightly. This deflection produces a spring action between the bosses and the edges of the openings 34 so that the bosses are firmly held in position. Thus, the base 32 may be firmly attached to the frame 31 without the use of the usual attaching devices, such as rivets or bolts.

Two contact members 35, only one appearing in the drawings, are suitably secured on the base 32, for example, by imbedding a portion thereof in the molded material of the base. These contact members 35 may be provided with threaded openings for receiving terminal screws 36 by which wires may be attached to the contact members for connecting the switch in series circuit with the refrigerator motor. A flat, U shaped switch lever 40 is pivotally mounted between the walls 22, and this lever carries a contact bar 41, which bar is adapted to engage and bridge the contact members 35 for completing the refrigerator motor circuit between these contacts. The switch lever 40 comprises a substantially channel shaped sheet metal plate 42 having two laterally extending flanges 43. A bearing lug 44 extends laterally from each of the flanges 43 and through wedge shaped openings 45 formed in the walls 22 of the frame 21 for forming pivots about which the switch lever 40 may be rotated. A furcated plate of insulating material 46 is attached to the flanges 43 of the plate 42 by lugs 47 formed on the plate 42, which lugs are clinched over the sides of the insulation 46. The switch lever 40 is adapted to be snap actuated by a toggle lever 51 that is pivoted at one end of the upper end of the lever 40. The pivots for the lever 51 are formed by two inwardly extending lugs 52 formed on the sheet metal plate 42 of the lever 40, and the end of the lever 51 is provided with V notches in which the edges of the lugs 52 are received. The lever 51 is formed by a hair pin shaped channel member, and it extends between the tines of the furcated portion of the insulation member 46. The flanges 53 of the lever 51 are adapted to strike the member 46 adjacent the yoke portion thereof, when the lever is vibrated, for moving the lever 40 about its pivot with a snap movement. The flanges 53 of the lever 51 are spaced apart greater than the thickness of the insulating member 46, so that there will be a lost motion connection between the lever 51 and the insulating member 46.

The lever 51 is adapted to be vibrated about its pivot with a snap action by a tension spring 54 that is connected at one end to the yoke of lever 51 and the other end being connected to one end of a bell crank lever 55. It is apparent that when the spring 54 is moved by the lever 55 from one side to the other of the dead center of the lever 51, with respect to the spring and lever 51, the lever 51 will be vibrated with a snap action and cause the switch member 40 to open and close the circuit of the refrigerator motor. The spring 54 maintains the lever 51 in engagement with the pivot lugs 52 of the lever 40 and the bearing lugs 44 of the lever 40 in the vertex of the wedge shaped openings 45 in the walls 22.

The bell crank lever 55 is preferably formed of a channel shaped metal stamping, and it is pivoted on the frame 21 by a pin 56 extending through the side flanges of the lever, the ends of which pin are journaled in openings formed in the walls 22 of the frame. The forwardly extending portion of the lever 55 is provided with a tongue 57, which tongue extends outwardly of the frame 21 through an opening 58 formed in the plate 25. The tongue 57 is arched for forming a cam following surface. An arm 59 is formed on the lever 55 and forms a stop for the switch lever 40. Also, when the lever 55 is rotated clockwise, the arm 59 moves the lever 40 toward the switch closing position prior to snap movement of the latter in the switch closing direction.

A channel shaped lever 60 is also pivoted on the pin 56, and extends above the forwardly extending portion of the bell crank lever 55. The lever 60 is adapted to be rotated clockwise by a thermostatic device 61, which device may comprise, for example, a casing 62 enclosing a bellows or diaphragm connected with a bulb, by a tube 63. The bellows and bulb are not shown. The bellows, tube and bulb may contain a volatile fluid, the pressure of which varies with changes in the temperature of the bulb, and the bulb may be subjected to the temperature of the evaporator of the refrigerator. This type of thermostatic device is well known to the art, and therefore, it is not described in detail. The casing 62 may be attached to the flanges 24 by rivets, for example, and closes one side of the frame. It also assists in maintaining the walls of the frame rigid. The diaphragm or bellows is connected with the lever 60 by a pin 64, which pin extends upwardly through an opening 65 formed in the bell crank lever 55 and engages in the vertex of a cone shaped depression formed in the lever 60.

A compression spring 66 is compressed between the lever 60 and a washer 67, which washer is threaded on a bolt 68. The bolt 68 is rotatably mounted in the wall of a lever 69 by providing a collar 72 on the bolt and extending the head of the bolt through an opening in the top wall of the lever 69. The compression of spring 66 maintains the head of the bolt in its opening. The lever 69 is formed of a channel shaped sheet metal member and is furcated at the rear end thereof. The end portions of the tines of the furcated portion of the lever are turned outwardly and extend into wedge shaped openings 70 formed in the side walls 22 of the frame. These out-turned portions are urged in engagement with the vertex of the wedged shaped openings 70 by the spring 66, and form a pivot for the lever 69. The forward part of the lever 69 extends downwardly, and a tongue 71 formed thereon extends forwardly through the opening 58 in the plate 25. The tongue 71 is arched axially for forming a cam following surface. This tongue does not extend forwardly as far as the tongue 57 of the lever 55. It is apparent that when the lever 69 is raised and lowered about its pivot, the compression of the spring 66, and consequently the pressure on the lever 60, will be varied. This, as is well understood by those familiar with the art, varies the temperatures at which the thermostatic device 61 operates the switch mechanism 35. An opening 73 is formed in the wall 23 of the frame so that the initial compression of the spring 66 can be adjusted by a tool extended through the opening.

The side walls 22 of the frame 21 are off-set inwardly at 75, and an opening 76 is formed in each of these off-set portions. The openings 76 are formed having downwardly extending stop members 77, and the forward end of the lever 60 is provided at each side with a laterally extending lug 78, which lugs extend into the openings 76 and engage the stops 77 for limiting clockwise rotation of the lever 60. The off-set sections 28 of the plate 25 substantially register with the off-set portions 75 formed in the walls 22, thus forming a covered recess for the ends of the laterally extending lugs 78.

The spring 54 of the switch mechanism 35 continually biases the lever 55 clockwise, and an upturned lug 79 is provided on the lever 55 for engaging the lever 60. Thus, when the lever 60 is rocked about its pivot by the thermostatic device 61 and the spring 66, the tension of the spring 54 causes the lever 55 to follow the movement of the lever 60, and this movement causes the toggle switch 31 to be opened and closed.

An adjusting mechanism is provided for varying the tension of the compression spring 66, so that the range of temperatures at which the switch 35 is operated can be adjusted by the user of the refrigerator. This adjusting mechanism comprises a stud 82 which is secured to the plate 25 by extending an end thereof through an opening in the plate and then flattening the end against the inner side of the plate. A tubular shaft 83 is mounted on the stud 82, and is spaced from the plate 25 by a washer 84 secured to the stud. The inner end of the shaft 83 is provided with a cam 85 which is adapted to engage the tongue 71 and causes the lever 69 to be moved about its pivot as the cam is rotated to different positions by the shaft. An ear 86 is formed on the cam 85 and is adapted to strike the tongue 71 for limiting rotation of the shaft 83. The shaft 83 may be provided with a suitable knob 87 by which the operator of the refrigerator can turn the shaft.

It is often desirable to provide means for maintaining the switch 31 in its open position, regardless of the temperatures in the refrigerator. For example, it may be desirable to terminate operation of the refrigerator until the ice has melted from the evaporator thereof.

In order that the switch 31 may be opened manually, I have provided a second cam 88 on the shaft 83, which cam is arranged to engage the tongue 57 and depress the same when the shaft 83 is rotated toward one of its limits, which limit is determined by the ear 86 engaging the tongue 71. It will be noted that the cam 88 clears the end of the tongue 71, since that tongue is shorter than the tongue 57. Since the lever 55 is biased against the lever 60 by the spring 54, which is a relatively light spring, the lever 55 is easily moved counterclockwise to cause opening of the switch 31. The lost motion connection between the levers 55 and 60 permits the former lever to be moved to the switch opening position without affecting the thermostatic device 61.

Preferably, I provide an opening 89 in one of the side walls 22 of the frame so that the position of the arm 59 can be adjusted by a tool inserted through the opening.

A cover 90 is provided for closing the end of the frame 21 intermediate the block 36 and the yoke wall 23 of the frame. This cover may be attached by extending lugs from the walls 22 through slots in the cover, and then clinching these lugs. The cover 90 has a wing portion 91 which covers the wedge shaped openings 45, 70 and 89 in one of the side walls 22 of the frame 21.

By my invention I have provided a thermostatically operated switch which may be opened manually without causing undue stresses on the thermostatic device, and which is formed by a minimum number of parts. Also the temperatures at which the apparatus operates may be adjusted and the switch opened by a single knob.

While the form of embodiment of the present invention as herein disclosed constitutes a preferred form, it is to be understood that other forms might be adopted, all coming within the scope of the claims which follow.

I claim:

1. A control apparatus comprising in combination, a member movable in opposite directions in response to changes in a condition to be controlled; a snap acting control mechanism including a snap member and a spring for imparting movement to the snap member; a lever movable into and out of engagement with the first mentioned member, said spring being connected with the lever to continually urge the lever into engagement with the first mentioned member for causing the lever to follow the movement of the first mentioned member when the latter moves in either direction, said spring causing snap movement of said snap member in one direction and then the other when the lever is moved in opposite directions; and means for causing disengagement of the lever and the first mentioned member and for maintaining the lever in its disengaged position regardless of movements of the first mentioned member.

2. A control apparatus comprising in combination, a member movable in opposite directions in response to changes in a condition to be controlled; a snap acting control mechanism including a snap member and a spring for imparting movement to the snap member; a lever movable into and out of engagement with the first mentioned member, said spring being connected with the lever to continually urge the lever into engagement with the first mentioned member for causing the lever to follow the movement of the first mentioned member when the latter moves in either direction, said spring causing snap movement of said snap member in one direction and then the other when the lever is moved in opposite directions; and means operated manually for causing disengagement of the lever and the first mentioned member and for maintaining the lever in its disengaged position regardless of movements of the first mentioned member.

3. In a control apparatus, a frame including a wall, said wall having an elongated opening therein; and a member supported by said wall, said member having an elongated part adapted to extend into said opening, said part having an edge extending lengthwise of an edge of said wall which defines said opening, said edges being formed to engage one another adjacent opposite ends of the said part and to be separated intermediate said ends, and an edge of the wall opposite the first mentioned edge of the wall, and which defines one side of the opening, being in engagement with said part on the side opposite the first mentioned edge of said part and out of engagement with the end portions of said part, said part being compressed intermediate said edges of the wall whereby it is in resilient engagement with said edges of the wall.

ESTEL C. RANEY.

DISCLAIMER 2,304,019.—*Estel C. Raney*, Columbus, Ohio. CONTROL APPARATUS. Patent dated December 1, 1942. Disclaimer filed September 17, 1943, by the assignee, *Ranco Incorporated*.

Hereby enters this disclaimer to claims 1 and 2.

[*Official Gazette October 19, 1943.*]